United States Patent [19]

Richter et al.

[11] Patent Number: 5,341,544

[45] Date of Patent: Aug. 30, 1994

[54] FASTENER ASSEMBLY FOR DETACHABLY CONNECTING A DOOR TRIM PANEL

[75] Inventors: Thomas L. Richter, Sterling Heights; Michael W. Jary, West Bloomfield, both of Mich.

[73] Assignee: General Motors Corporation, Detroit, Mich.

[21] Appl. No.: 57,928

[22] Filed: May 7, 1993

[51] Int. Cl.$^5$ ............................................. A44B 17/00
[52] U.S. Cl. ................................... 24/289; 24/297; 24/453
[58] Field of Search .............. 24/289, 290, 297, 453, 24/682, 662, 616; 52/509, 511, 716.6; 49/502, 492.1

[56] References Cited

U.S. PATENT DOCUMENTS

| | | | |
|---|---|---|---|
| 1,737,246 | 11/1929 | Jones | 24/616 |
| 2,655,239 | 10/1953 | Kenlock | 24/289 |
| 3,230,592 | 1/1966 | Hosea | 52/509 |
| 3,744,101 | 7/1973 | Gley | 24/453 |
| 5,056,199 | 10/1991 | Stein et al. | 24/682 |
| 5,111,619 | 5/1992 | Billin et al. | 49/502 |
| 5,202,172 | 4/1993 | Graf | 24/297 |
| 5,233,731 | 8/1993 | Phillips | 24/453 |

*Primary Examiner*—Victor N. Sakran
*Attorney, Agent, or Firm*—Todd L. Moore

[57] ABSTRACT

A fastener assembly for detachably connecting a molded door trim panel to an apertured inner door panel of a vehicle, where upon disassembly, the fastener assembly will disengage, or a replaceable portion will fracture without damaging the molded door trim panel. A detent is utilized to connect a hook portion to a retainer housing that is molded into the molded door trim panel. Upon the hook portion being mistakenly pulled against the inner door panel during disassembly, the detent will either disengage the hook portion from the retainer housing, or the hook portion will fracture before the retainer housing is damaged or disconnected from the molded door trim panel. By preventing damage to the retainer housing and molded door trim panel, only the hook portion of the hook fastener assembly need be replaced or reconnected, instead of the entire molded door trim panel.

4 Claims, 2 Drawing Sheets

FASTENER ASSEMBLY FOR DETACHABLY CONNECTING A DOOR TRIM PANEL

The present invention relates to vehicle door trim panels and more particularly to a fastener assembly that detachably connects a molded door trim panel to an inner door panel of a vehicle in a manner that prevents damage to the molded door trim panel upon detachment.

BACKGROUND OF THE INVENTION

It is well known to use rigid hooks for connecting a molded door trim panel to an inner door panel of a vehicle. Such rigid hooks are typically molded into the molded door trim panel and utilized to engage corresponding apertures in the inner door panel. Upon servicing the door, it is often desired to remove the molded door trim panel from the inner door panel. Since the rigid hooks are hidden behind the inner door panel, the disassembler cannot see how the rigid hooks disconnect from the inner door panel. Upon pulling the molded door trim panel from the inner door panel, the rigid hook may be pulled against the inner door panel causing the rigid hook to fracture or become disconnected from the molded door trim panel. Because the rigid hooks are molded into the molded door trim panel, the entire molded door trim panel must be replaced. Such replacement is costly in light of the fact that the entire assembly must be replaced.

It would be desirable to provide a new and improved fastener assembly that detachably connects a molded door trim panel to an inner door panel of a vehicle and permits removal of the molded door trim panel without damage.

SUMMARY OF THE INVENTION

The present invention provides a two-piece fastener assembly that detachably connects a molded door trim panel to an inner door panel of a vehicle in a manner that prevents damage to the molded door trim panel upon detachment. The fastener assembly comprises a retainer housing molded into the molded door trim panel and a hook portion detachably connected to the retainer housing. Since the hook portion is hidden behind the inner door panel, the disassembler cannot see how the hook portion disconnects from the inner door panel. Upon pulling the molded door trim panel from the inner door panel, the hook portion may be pulled against the inner door panel causing the hook portion to either fracture or disengage from the retainer housing without damaging the molded door trim panel. An additional feature of the present invention provides matching alignment surfaces on the two pieces of the fastener assembly which provide proper outwardly downward orientation of the hook portion relative to the inner door panel.

In the preferred form, the present invention utilizes a two-piece fastener assembly having a retainer housing and a hook portion. The retainer housing is molded into the molded door trim panel and provides an aperture by which to receive the hook portion. The hook portion provides a pair of substantially parallel legs that extend outward and snugly fit in the aperture of the retainer housing. Each leg of the hook portion has a locking knob extending outwardly away from the other leg. These locking knobs correspond to locking holes in the retainer housing to provide a detent.

The hook portion also has an alignment surface that corresponds with an alignment surface on the retainer housing to establish a proper outwardly downward orientation of the hook portion relative to the inner door panel. The hook portion will only assemble to the retainer housing when the alignment surfaces are properly aligned. The hook portion inserts through an aperture in the inner door panel, and a raised portion of the inner door panel is wedged between the hook portion and the molded door trim panel to retain the molded door trim panel to the inner door panel.

Since the hook portion is hidden behind the inner door panel, the hook portion may be mistakenly pulled against the inner door panel during disassembly of the molded door trim panel from the inner door panel. The detent will then either disengage the hook portion from the retainer housing, or the legs of the hook portion will fracture before the retainer housing is damaged or disconnected from the molded door trim panel. By having either the detent disengage or the legs of the hook portion fracture, the molded door trim panel is free from damage and may be reassembled to the inner door panel by simply replacing or reconnecting the hook portion.

Thus, the objects of the present invention are to provide a new and improved fastener assembly that detachably connects a molded door trim panel to an apertured inner door panel of a vehicle and that disengages upon disconnecting the molded door trim panel from the apertured inner door panel without damaging the molded door trim panel; to provide a new and improved fastener assembly that provides for proper orientation of the fastener assembly relative to the inner door panel.

DESCRIPTION OF THE PREFERRED EMBODIMENTS

Figure 1:
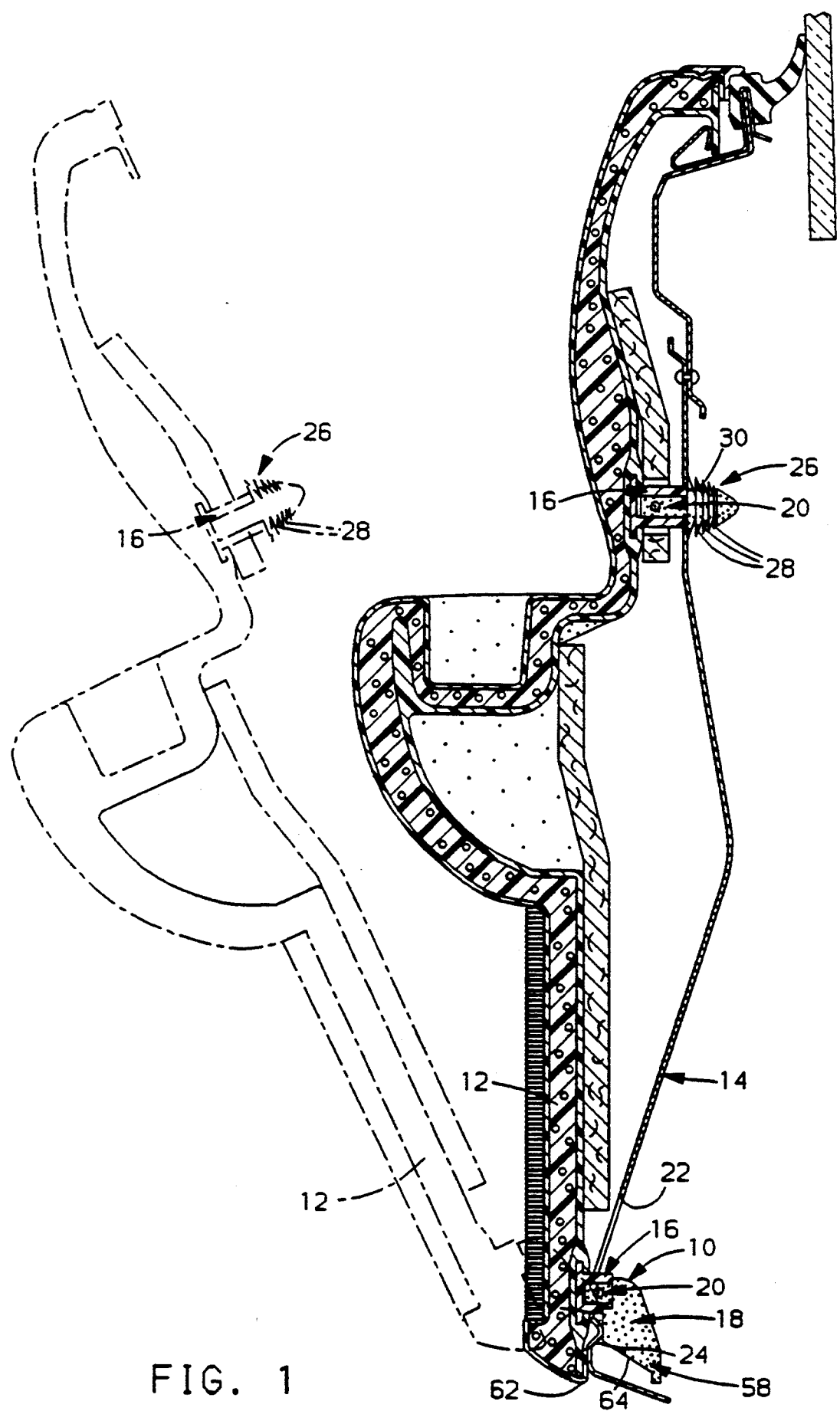
FIG. 1 is a side elevation view showing the fastener assembly detachably connecting the molded door trim panel to the inner door panel of a vehicle and showing, in phantom line, the first position for assembling the molded door trim panel to the inner door panel.

Referring to the drawings, the present invention will now be described in detail with reference to the preferred embodiments.

FIG. 1 shows a fastener assembly (10) detachably connecting the bottom of a molded door trim panel (12) to an inner door panel (14) of a vehicle (not shown). The fastener assembly (10) has a retainer housing (16) molded into the molded door trim panel (12) and a rigid hook portion (18) connected to the retainer housing (16) by a detent (20). The hook portion (18) is inserted through an aperture (22) in the inner door panel (14) and extends outwardly downward. A raised portion (24) of the inner door panel (14) is wedged between the molded door trim panel (12) and the hook portion (18) to retain the molded door trim panel (12) to the inner door panel (14).

The fastener assembly (10) is shown being utilized with a conventional Christmas tree fastener (26) to connect the top of the molded door trim panel (12) to the inner door panel (14). The Christmas tree fastener (26) comprises flexible elastic rings (28) that are axially spaced and inserted through an aperture (30) in the inner door panel (14). A similar retainer housing (16), as provided in the fastener assembly (10), is molded into the molded door trim panel (12) and utilized to connect the Christmas tree fastener (26) by a similar detent (20) as the fastener assembly (10).

Figure 2:
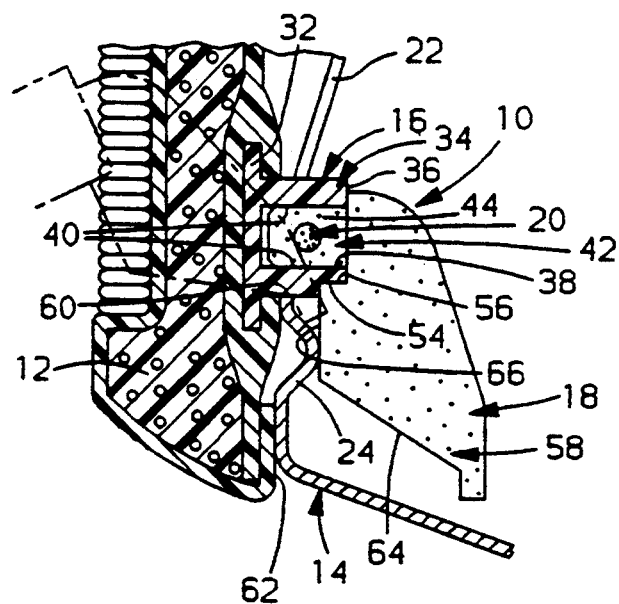
FIG. 2 is an enlarged side elevation view showing the inner door panel of a vehicle wedged between the hook portion and the molded door trim panel and showing, in phantom line, the first position of the hook portion upon assembling the molded door trim panel to the inner door panel.
Figure 3:
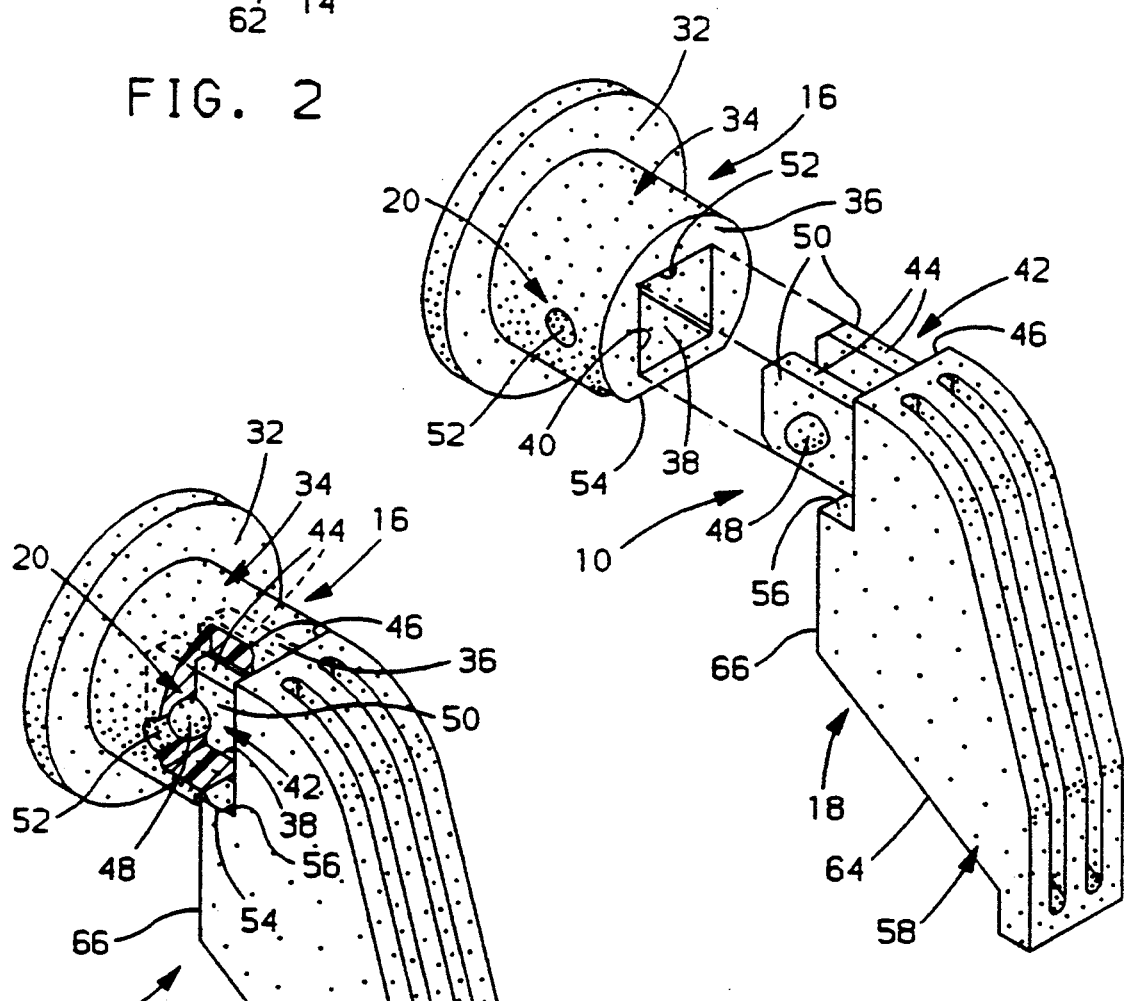
FIG. 3 is an exploded view showing the detent of the fastener assembly in which the retainer of the hook portion is received by the aperture of the retainer housing.

As seen in FIGS. 2 and 3, the retainer housing (16) has a flat cylindrical base (32) that provides for good retention of the retainer housing (16) when molded into the molded door trim panel (12). A substantially cylindrical retaining portion (34) is integral with and extends outward from the base (32) towards the inner door panel (14). The retaining portion (34) has a free end face (36) that is substantially parallel to the base (32) and which provides for an abutment against the hook portion (18). The retaining portion (34) has a substantially square aperture (38) extending from the free end (36) of the retaining portion (34) and is defined by inner walls (40) of the retaining portion (34).

The hook portion (18) has a retainer (42) that is received by the aperture (38) of the retaining portion (34). The retainer (42) comprises a pair of substantially parallel legs (44) extending substantially perpendicularly outward from a substantially flat front face (46) of the hook portion (18). The front face (46) is substantially parallel to the free end (36) of the retaining portion (34), and the front face (46) abuts the free end (36) upon the retaining portion (34) receiving the retainer (42).

Figure 4:
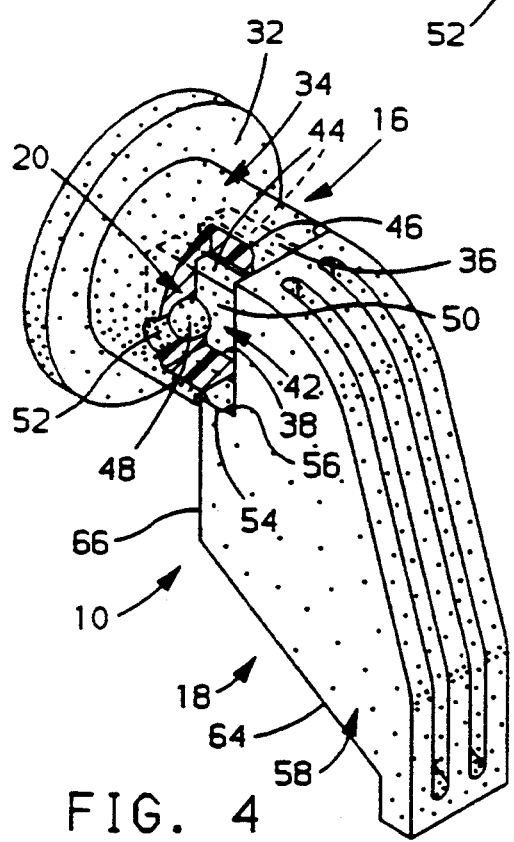
FIG. 4 is a perspective view of the fastener assembly with some parts cutaway showing the engagement of the locking knobs in the locking holes.

The legs (44) of the retainer (42) are spaced so that the legs (44) are snugly received by the aperture (38) of the retaining portion (34). Each leg (44) has a locking knob (48) extending outward from an outside wall (50) of the leg (44). Upon the legs (44) flexing toward each other, the retainer (42) is received by the retaining portion (34). Upon the legs (44) relaxing, the locking knobs (48) engage corresponding locking holes (52) in the inner walls (40) of the retaining portion (34) that define the aperture (38), as seen in FIG. 4. The detent (20) is provided by the snug fit of the legs (44) in the aperture (38) of the retaining portion (34) and the mating of the locking knobs (48) in the locking holes (52).

As seen in FIGS. 2 and 3, the retaining portion (34) of the retainer housing (16) also has a substantially flat alignment surface (54) on the bottom of the retaining portion (34). The alignment surface (54) is substantially perpendicular to and extends from the free end (36) of the retaining portion (34) to a point substantially midway between the base (32) and the free end (36). The flat alignment surface (54) of the retaining portion (34) corresponds to a substantially flat shelf (56) extending perpendicularly outward from the front face (46) of the hook portion (18). The flat alignment surface (54) of the retaining portion (34) and the flat shelf (56) of the hook portion (18) interface and abut one another to provide for alignment of the hook portion (18) relative to the retainer housing (16). Due to the alignment surfaces (54),(56), the hook portion (18) can only be assembled in the outwardly downward orientation relative to the inner door panel (14).

Prior to assembling the molded door trim panel (12) to the inner door panel (14), the hook portion (18) is connected to the retainer housing (16) via the detent (20). As seen in FIG. 1, the molded door trim panel (12) is assembled to the inner door panel (14) by inserting the fastener assembly (10) through the aperture (22) provided in the inner door panel (14). As seen in phantom line of FIGS. 1 and 2, the hook portion (18) has a downwardly angled finger (58) that overlies an edge (60) of the inner door panel (14) that defines the aperture (22), while the bottom (62) of the molded door trim panel (12) contacts the inner door panel (14). As seen in phantom line of FIG. 1, the molded door trim panel (12) is cantilevered at an acute angle relative to the inner door panel (14) so that an assembler can complete miscellaneous assembling of the molded door trim panel (12).

To connect the molded door trim panel (12) to the inner door panel (14), the molded door trim panel (12) is pivoted upward towards the inner door panel (14) while a surface (64) of the finger (58) slides outwardly downward across the edge (60) of the inner door panel (14). Upon the molded door trim panel (12) pivoting and becoming adjacent to the inner door panel (14), a second surface (66) of the finger (58) contacts the raised portion (24) of the inner door panel (14). The raised portion (24) of the inner door panel (14) is wedged between the molded door trim panel (12) and the hook portion (18) to retain the molded door trim panel (12) to the inner door panel (14). The Christmas tree fastener (26) is inserted through its corresponding aperture (30).

To disassemble the molded door trim panel (12) from the inner door panel (14), the hook portion (18) and the conventional Christmas tree fastener (26) must be pulled back through their respective apertures (22),(30) in the inner door panel (14). To disconnect the hook portion (18), the molded door trim panel (12) must be pivoted in reverse order as the previously described assembly procedure. The top of the molded door trim panel (12) is pulled away from the inner door panel (14) while pivoting at the bottom of the molded door trim panel (12) until the hook portion (18) is rotated back through the aperture (22). Since the hook portion (18) is hidden behind the inner door panel (14), the hook portion (18) may be mistakenly or incorrectly pulled against the inner door panel (14) when pulling the molded door trim panel (12) away from the inner door panel (14). Upon pulling the hook portion (18) against the inner door panel (14), the detent (20) will either disengage the hook portion (18) from the retainer housing (16), or the legs (44) of the retainer (42) will fracture before the retainer housing (16) or molded door trim panel (12) is damaged.

If the force applied to the hook portion (18) against the inner door panel (14) is an axial force, the detent will disengage before the molded door trim panel (12) is damaged, and the hook portion (18) need only be reconnected to the retainer housing (16) before reassembly. If the force bends the hook portion, the legs (44) of the retainer (42) will fracture before the molded door trim panel (12) is damaged, and the hook portion (18) must then be replaced and reconnected before reassembly. The result is that the repair cost is dramatically reduced by only having to replace the hook portion (18) of the hook fastener assembly (10) instead of the entire molded door trim panel (12), including the molded-in retainer housing (16).

It should be noted that the present invention is not limited to a hook portion (18) as a means for retaining the molded door trim panel (12) to the inner door panel (14), but rather, any fastener may be utilized, such as a bolt head in conjunction with a key slot or a Christmas tree fastener (26) as previously described. Thus, it is seen that the invention provides a new and improved fastener assembly (10) that detachably connects the molded door trim panel (12) to the inner door panel (14) of a vehicle without damaging the molded door trim panel (12) upon detachment.

The embodiments of the invention in which an exclusive property or privilege is claimed are defined as follows:

1. A fastener assembly for detachably connecting a trim panel to an apertured body panel of a vehicle comprising:
    a retainer housing having a base connected to said trim panel, said retainer housing extending from said base through said apertured body panel and having a face on a side of the body panel opposite the base;
    a hook fastener for extending through said aperture of said body panel, said hook fastener extending outwardly downward from said trim panel and engaging said body panel to retain said trim panel to said body panel; and
    means for detachably connecting said retainer housing to said fastener so that said trim panel can be disconnected from said body panel without damaging said retainer housing and said trim panel and without disconnecting said retainer housing from said trim panel.

2. A fastener assembly as stated in claim 1 including means for aligning said hook fastener to said retainer housing to provide a desired orientation of said hook fastener relative to said body panel.

3. A fastener assembly for detachably connecting a trim panel to an apertured body panel of a vehicle comprising:
    a retainer housing having a base connected to said trim panel and a retaining portion integral with and extending from said base toward said body panel, the retaining portion having a face on a side of the body panel opposite the base;
    said retaining portion of said retainer housing having an aperture defined by walls of said retaining portion and said walls having at least one locking hole;
    a hook portion having a retainer and a finger;
    said finger extending outwardly downward from said trim panel for extending through said aperture in said body panel so that said body panel is wedged between said trim panel and said finger to retain said trim panel to said body panel;
    at least one leg integral with and extending from said retainer and received by said aperture in said retaining portion;
    at least one locking knob integral with and extending from said leg and received by said locking hole in said walls of said retaining portion defining said aperture for detachably connecting said hook portion to said retainer housing so that upon said finger being pulled against said inner door panel during disassembly of said trim panel from said body panel, said trim panel will disconnect from said body panel without damaging said retainer housing and said trim panel and without disconnecting said retainer housing from said trim panel;
    a first alignment surface on said retaining portion of said retainer housing; and
    a second alignment surface on said retainer of said hook portion to position said retainer relative to said retaining portion and to provide a desired orientation of said finger relative to said body panel.

4. A fastener assembly for detachably connecting a molded door trim panel to an apertured inner door panel of a vehicle comprising:
    a retainer housing having a base molded into said molded door trim panel and a retaining portion integral with and extending from said base toward said inner door panel with a face on a side of the body panel opposite the base;
    said retaining portion being substantially cylindrical and having a free end substantially parallel with said base and having a substantially flat alignment surface perpendicular to said free end;
    said retaining portion having a substantially square aperture partially defined by a pair of side walls of said retaining portion extending from said free end into said retaining portion and said pair of side walls each having a locking hole;
    a hook portion having a retainer and a finger;
    said finger being rigid and extending outwardly downward from said molded door trim panel for extending through said aperture in said inner door panel and contacting said inner door panel to wedge and retain said inner door panel between said molded door trim panel and said finger;
    said retainer face being substantially flat that is substantially parallel to said free end of said retaining portion and having a pair of substantially parallel legs projecting perpendicularly outward from said flat retainer face, and said legs being spaced from each other so that said aperture snugly receives said legs;
    said retainer having a substantially flat alignment surface extending outward from and substantially perpendicular to said flat retainer face of said retainer and said alignment surface of said retainer engaging said alignment surface of said retaining portion to provide a desired orientation of said hook portion relative to said retainer housing;
    a locking knob projecting outwardly from each leg and away from said other leg and engaging said locking holes in said pair of side walls defining said aperture by flexing said legs together and inserting said legs into said aperture, and said locking knobs engaging said locking holes upon said legs relaxing in said aperture so that upon said finger being pulled axially against said inner door panel during disassembly of said molded door trim panel from said inner door trim, said locking knobs will disengage from said locking holes and said molded door trim panel will disconnect from said inner door panel without damaging said retainer housing and said molded door trim panel and without disconnecting said retainer housing from said molded door trim panel; and
    said legs having a certain strength so that upon said finger being bent against said inner door panel during disassembly of said molded door trim panel from said inner door panel, said legs will fracture, and said molded door trim panel will disconnect from said inner door panel without damaging said retainer housing and said molded door trim panel and without disconnecting said retainer housing from said molded door trim panel.

* * * * *